(12) United States Patent
Takemura

(10) Patent No.: US 6,657,658 B2
(45) Date of Patent: Dec. 2, 2003

(54) METHOD OF AND SYSTEM FOR IMAGE PROCESSING, METHOD OF AND SYSTEM FOR IMAGE REPRODUCTION AND IMAGE CONFIRMATION SYSTEM FOR USE IN THE METHODS

(75) Inventor: Kazuhiko Takemura, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/115,265

(22) Filed: Jul. 14, 1998

(65) Prior Publication Data

US 2003/0193598 A1 Oct. 16, 2003

(30) Foreign Application Priority Data

Jul. 14, 1997 (JP) .............................. 9/188618
Jul. 17, 1997 (JP) .............................. 9/192554
Jul. 9, 1998 (JP) ............................. 10/193882

(51) Int. Cl.$^7$ .......................... H04N 9/04; H04N 5/228; H04N 5/222
(52) U.S. Cl. ........................... 348/207.99; 348/333.02; 348/333.12; 348/222.1
(58) Field of Search ....................... 348/333.01, 333.02, 348/333.03, 333.11, 333.12, 333.04, 240, 222.1, 207.99

(56) References Cited

U.S. PATENT DOCUMENTS

| | | | | | |
|---|---|---|---|---|---|
| 5,414,537 A | * | 5/1995 | Omuro et al. | ............... | 358/518 |
| 5,486,893 A | * | 1/1996 | Takagi | ........................ | 396/147 |
| 5,650,819 A | * | 7/1997 | Sato et al. | .................. | 348/240 |
| 5,668,596 A | * | 9/1997 | Vogel | ...................... | 348/222.1 |
| 5,696,850 A | * | 12/1997 | Parulski et al. | ............. | 382/261 |
| 5,710,954 A | * | 1/1998 | Inoue | ..................... | 348/333.01 |
| 5,745,215 A | * | 4/1998 | Miyauchi et al. | ............. | 355/38 |
| 5,870,143 A | * | 2/1999 | Suzuki | ................... | 348/333.02 |
| 5,903,309 A | * | 5/1999 | Anderson | .............. | 348/333.02 |
| 5,940,121 A | * | 8/1999 | Mcintyre et al. | ............. | 348/64 |
| 5,966,553 A | * | 10/1999 | Nishitani et al. | ............. | 348/64 |
| 6,008,844 A | * | 12/1999 | Tsuda et al. | ........... | 348/333.02 |
| 6,040,856 A | * | 3/2000 | Sakaegi | ....................... | 348/232 |
| 6,055,381 A | * | 4/2000 | Maruyama | ................... | 348/333 |
| 6,201,571 B1 | * | 3/2001 | Ota | ........................... | 348/239 |
| 6,334,030 B1 | * | 12/2001 | Mizumo et al. | ............ | 396/310 |
| 2001/0015760 A1 | * | 8/2001 | Fellegara et al. | ...... | 348/333.01 |
| 2002/0033888 A1 | * | 3/2002 | Yamagami | ................... | 348/232 |

* cited by examiner

Primary Examiner—Wendy R. Garber
Assistant Examiner—Lin Ye
(74) Attorney, Agent, or Firm—Birch, Stewart, Kolasch & Birch, LLP

(57) ABSTRACT

When carrying out an image processing on given digital image data, an image confirmation system having functions of setting a condition of image processing which is to be carried out on the given digital image data according to a desired finish, displaying a visible image on the basis the digital image data processed according to the set image processing condition so that whether the processed digital image data actually produces a picture of the desired finish can be confirmed through the visible image displayed, and obtaining desired image processing condition information representing the image processing condition which has been confirmed to be suitable for producing a picture of the desired finish is used to take in the digital image data and the desired image processing condition information. Image processing is carried out on the digital image data according to the image processing condition represented by the desired image processing condition information.

26 Claims, 6 Drawing Sheets

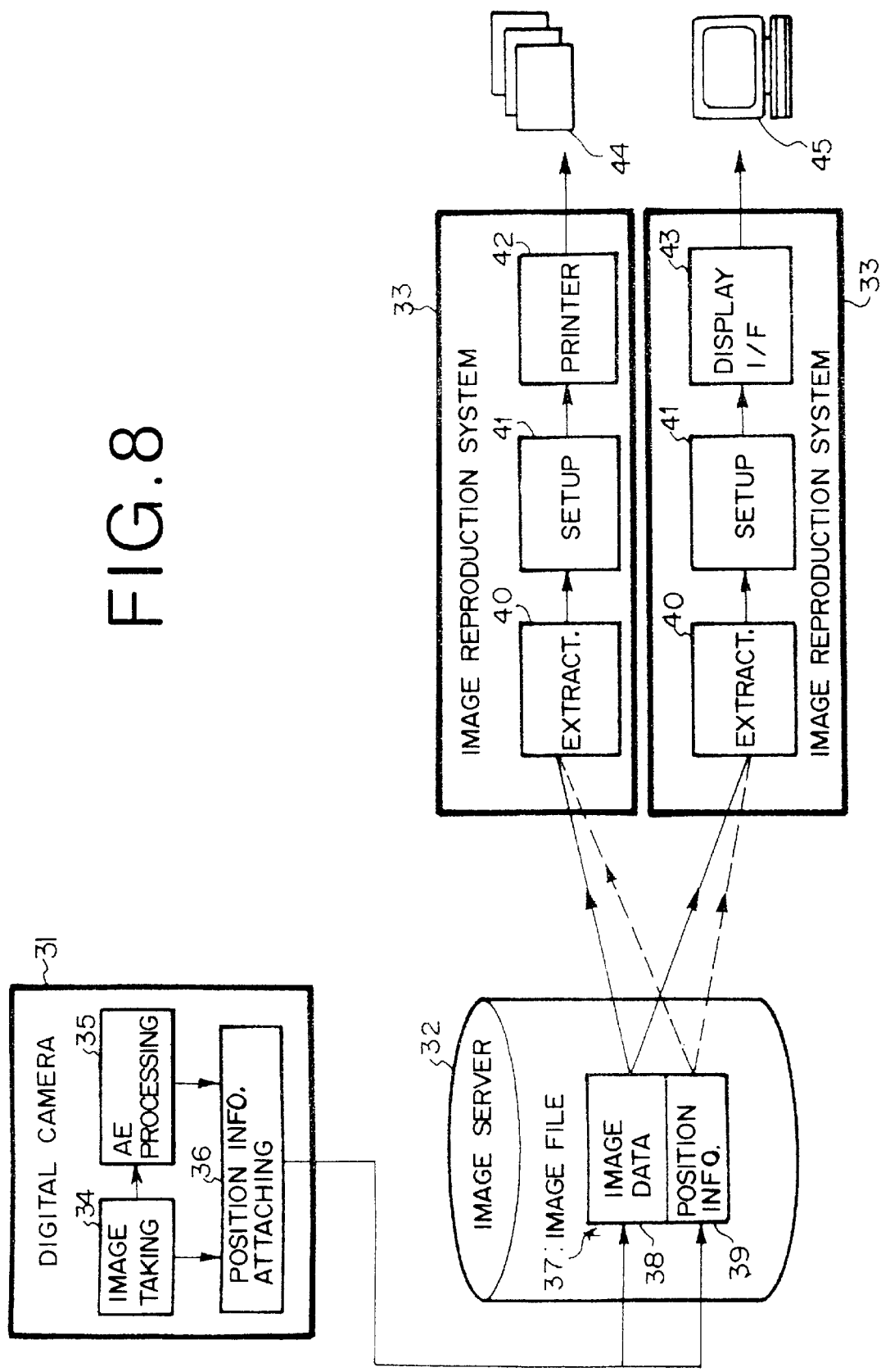

METHOD OF AND SYSTEM FOR IMAGE PROCESSING, METHOD OF AND SYSTEM FOR IMAGE REPRODUCTION AND IMAGE CONFIRMATION SYSTEM FOR USE IN THE METHODS

BACKGROUND OF THE INVENTION

1. Field of the Invention

This invention relates to reproduction of digital image data obtained through a digital camera or the like as a visible image on a photographic print or a display system such as a WWW, and more particularly to a method of and a system for carrying out image processing on such digital image data, a method of and a system for reproducing such digital image data and an image confirmation system for use in carrying out the methods.

2. Description of the Related Art

Recently there has been developed a system in which image data is read out from a negative film and the image data is reproduced as a visible image on a photographic print or a display system such as a CRT after subjected to various corrections such as on color, gradation and brightness. Such corrections are carried out when a high quality reproduced image would not be obtained when the image data is reproduced as it is due to inappropriate photographing conditions such as overexposure or underexposure, or when the image quality is to be modified according to the tastes of the photographer.

Further recently there has been offered a service in which a necessary correction is carried out according to the request of the customer on finish of the print, e.g., to make the image tinged with sepia or to make the image tinged with orange so that the mood of the sunset is emphasized.

Further recently the similar service (or publication on Web or the like) has come to be offered on images taken by use of a digital camera and reproduction of images at high quality is expected as in images on negative film.

In the case of a picture printed from negative film, when a customer wants to trim the picture, the customer instructs a photo studio how to trim the picture viewing the printed picture and the photo studio prints a picture trimmed according to the instruction of the customer. Generally the trimmed picture is enlarged.

In the case of an image recorded on a photographic film, whether photographing was satisfactorily effected cannot be known until the film is developed and the image is read out and reproduced. Similarly result of correction for obtaining a desired finish of the print, that is, whether the correction results in the customer's desired finish, cannot be known until processing at the laboratory is completed.

Further when a picture recorded on negative film is to be trimmed, a picture without trimming must be once printed and the customer must instruct how to trim the picture viewing the printed picture. Accordingly the customer must visit the photo studio at least twice, which is very troublesome.

SUMMARY OF THE INVENTION

In view of the foregoing observations and description, the primary object of the present invention is to make it feasible to confirm whether processing set according to a desired finish of a picture actually results in the desired finish before the image is reproduced on a photographic print or a CRT according to the processed image data, thereby ensuring that a picture of the desired finish can be constantly obtained.

Another object of the present invention is to make it feasible to quickly reproduce a trimmed image when an image represented by a digital image data is to be trimmed.

In some digital camera, a liquid crystal monitor is provided and an image taken can be immediately displayed on the monitor. Even if a digital camera is not provided with such a monitor, an image taken by the digital camera can be displayed on a monitor by connecting the digital camera to the monitor. Further image data obtained through, for instance, an image scanner can be immediately subjected to data processing since the image data is inherently digital data.

The present invention has been made on the basis of this fact. That is, in an image processing method of the present invention, an image confirmation system having functions of setting a condition of image processing which is to be carried out on given digital image data according to a desired finish, displaying a visible image on the basis the digital image data processed according to the set image processing condition so that whether the processed digital image data actually produces a picture of the desired finish can be confirmed through the visible image displayed, and obtaining desired image processing condition information representing the image processing condition which has been confirmed to be suitable for producing a picture of the desired finish is used to take in the digital image data and the desired image processing condition information, and image processing is carried out on the digital image data according to the image processing condition represented by the desired image processing condition information.

It is preferred that the digital image data processed according to the image processing condition represented by the desired image processing condition information be reproduced as a visible image.

An image processing system of the present invention comprises a data taking means which takes in digital image data and desired image processing condition information from an image confirmation system having functions of setting a condition of image processing which is to be carried out on given digital image data according to a desired finish, displaying a visible image on the basis of the digital image data processed according to the set image processing condition so that whether the processed digital image data actually produces a picture of the desired finish can be confirmed through the visible image displayed, and obtaining desired image processing condition information representing the image processing condition which has been confirmed to be suitable for producing a picture of the desired finish, and an image processing means which carries out image processing on the digital image data according to the image processing condition represented by the desired image processing condition information.

It is preferred that the image processing system of the present invention be provided with an image reproduction means which reproduces as a visible image the digital image data processed according to the image processing condition represented by the desired image processing condition information.

A first image confirmation system of the present invention comprises an image processing condition setting means for setting a condition of image processing which is to be carried out on given digital image data according to a desired finish, a display/confirmation means which displays a visible image on the basis of the digital image data processed according to the set image processing condition so that whether the processed digital image data actually produces a picture of the desired finish can be confirmed through the visible image displayed, and an information taking means for obtaining desired image processing condition information representing the image processing condition which has been confirmed to be suitable for producing a picture of the desired finish.

The term "reproduction" as used herein means to reproduce the digital image data as a visible image on a recording material, thereby obtaining a hard copy, as in printing from negative film as well as to reproduce the digital image data as a visible image on a CRT or a monitor of a personal computer through a Web server. As a means for producing a hard copy, may be employed any known printer such as a photographic printer in which a photosensitive material is imagewise exposed to, for instance, a laser beam and developed, an ink jet printer, an electrophotograph, a sublimation printer and a type of printer in which a heat development photosensitive material exposed to a laser beam is superposed on an image receiving material and an image is heat-developed and transferred to the image receiving material such as a Pictrography 3000 (from Fuji Photo Film Co., Ltd).

"Finish" is represented as color balance, gradation balance, brightness and/or reproduction area and is set as a numerical value by an operator or a photographer. Otherwise, a plurality of types of finish such as black-and-white finish, sepia finish, pictorial finish and the like may be defined in advance and displayed as a menu on a monitor of a digital camera or the like so that the operator can select one of the types as a desired finish.

Adjustment has been made on photographs according to judgement of laboratory side. For example, in the case of a photograph taken at a dark place, an adjustment for making a print brighter than that obtained from negative film has been made. However, the term "a desired finish" as used herein means a finish based on the taste or intention of the customer rather than a finish which the laboratory side thinks suitable.

Further the visible image displayed on the basis of the digital image data processed according to the set image processing condition in the image confirmation system should not be limited to an image on the basis of the intact digital image data processed according to the set image processing condition but may be any image provided that a result of the image processing can be known from the image.

In an image reproduction method of the present invention, an image confirmation system having functions of displaying an image on the basis of given digital image data and obtaining position information on a desired area which is set on the displayed image is used to take in the position information and the digital image data, a part of the digital image data corresponding to said desired area is extracted from the digital image data, and an image is reproduced on the basis of the extracted part of the digital image data.

The "position information" is information on the position of picture elements representative of a desired area which is set on the displayed image. For example, the position information may be information on the picture elements at the upper left corner and/or the lower right corner of the desired area or at the four corners of the desired area in terms of XY coordinates whose origin is, for instance, at the lower left corner of the overall image displayed.

After the position information is obtained, an image based on the part of the digital image data corresponding to said desired area may be displayed in place of the image based on the original digital image data.

When the number of the picture elements contained in the part of the digital image data corresponding to the desired area is smaller than a predetermined value, an alarm may be made.

The predetermined value is a number of the picture elements which ensures an acceptable quality of the reproduced image. That is, when an image is reproduced on the basis of the extracted part of the digital image data in a size equivalent to that of the image based on the original digital image data, the image quality is inevitably deteriorated since the number of the picture elements in the extracted part of the digital image data is smaller than that in the original digital image data. However if the desired area is too small, the number of the picture elements becomes too small (e.g., a half of the overall picture elements in the original digital image data) to ensure acceptable image quality of the reproduced image. Accordingly by setting the predetermined value to an appropriate value, an alarm can be made to inform the operator of that there is fear that the image quality of the reproduced image can be deteriorated to an unacceptable level.

Further when the number of the picture elements contained in the part of the digital image data corresponding to the desired area is smaller than a predetermined value, an alternative area where the number of the picture elements contained in the part of the digital image data corresponding to the area is not smaller than the predetermined value may be set on the displayed image in place of the desired area.

An image reproduction system of the present invention is for carrying out the image reproduction method and is provided with a data extracting means which extracts a part of the digital image data corresponding to said desired area from the digital image data, and a reproducing means which reproduces an image is on the basis of the extracted part of the digital image data.

A second image confirmation system of the present invention comprises a display means which displays an image on the basis of given digital image data, an area setting means which sets a desired area on the displayed image, and a position information obtaining means which obtains information on the position of the desired area set by the area setting means.

The second image confirmation system may be provided with a desired area display means which displays an image based on the part of the digital image data corresponding to said desired area in place of the image based on the original digital image data.

Further the second image confirmation system may be provided with an alarm means which generates alarm when the number of the picture elements contained in the part of the digital image data corresponding to the desired area is smaller than a predetermined value.

Further the second image confirmation system may be provided with an area resetting means which, when the number of the picture elements contained in the part of the digital image data corresponding to the desired area is smaller than a predetermined value, sets an alternative area where the number of the picture elements contained in the part of the digital image data corresponding to the area is not smaller than the predetermined value on the displayed image in place of the desired area.

Such an alternative area may be an area containing therein picture elements in a number equal to the predetermined value or an area of a fixed size containing therein picture elements in a number larger than the predetermined value.

The first and second image confirmation systems of the present invention may comprise a digital camera with a liquid crystal monitor or a digital camera which is not provided with a monitor and in which an image taken by the digital camera can be displayed on a monitor by connecting the digital camera to the monitor. Further the digital camera may also include a mobile digital information terminal provided with the function of camera. Further the image confirmation system may comprise any system such as an image scanner other than the digital camera provided that it can obtain digital image data.

When the digital camera to be used as the first or second image confirmation system is an inexpensive one, an attempt to carrying out complicated image processing equivalent to that for printing will encounter difficulties in view of the cost and/or operating time. Even if the digital camera is able to carry out complicated image processing equivalent to that for reproduction, the result of the image processing cannot be completely displayed so long as the monitor associated with the digital camera is lower in resolution than that of the image to be reproduced. When the digital camera cannot have a sufficient function, the digital image data is reduced to conform to the resolution of the monitor associated with the digital camera and an image processing simplified as compared with that for reproduction is carried out on the reduced digital image data and an image may be displayed on the monitor on the basis of the digital image data processed in this manner.

The digital image data and the desired image processing condition information or the position information may be filed together in a format defined for the combination of the desired image processing condition information or the position information and may be stored together in a medium such as a built-in memory in the digital camera, a card memory, an image server in a laboratory system or a hard disc connected to a personal computer, or may be separately stored in different media.

As the data taking means which takes in the digital image data and the desired image processing condition information or the position information may comprise a card reader, a cable-connected interface, a media drive which takes in digital image data once stored in a hard disc or a removable medium of a personal computer, a communication means such as a network, or the like.

In accordance with the image processing method, the image processing system and the first image confirmation system of the present invention, since the image confirmation system has functions of setting a condition of image processing which is to be carried out on given digital image data according to a desired finish, and obtaining desired image processing condition information representing the image processing condition which has been confirmed to be suitable for producing a picture of the desired finish, desired image processing condition information which has been confirmed to be suitable by the operator viewing an image processed according to the condition can be delivered to a laboratory together with the original digital image data. Accordingly, a photographic print or a reproduced image in the desired finish can be surely obtained without repeating trial and error.

By making it feasible to input color balance, gradation balance, brightness and the like as kinds of finish, the request of the customer on finish of the print, e.g., to make the image tinged with blue so that blue of the sea is emphasized or to make the image brighter to generate a cheerful mood, can be more accurately reflected on the reproduced image. Further when the area of reproduction is set, a desired trimming can be accurately performed. When regular types of finish such as black-and-white finish and sepia finish, and the like are displayed so that the operator can select one of the types as a desired finish, the operation of inputting the desired finish is further facilitated.

In the image reproduction method and system of the present invention, since the image is reproduced on the basis of the extracted part of the digital image data which is extracted from the original digital image data according to the position information on a desired area which is set on the displayed image, only a desired area of the image can be immediately reproduced without once reproducing the overall original image.

In the second image confirmation system, by displaying an image based on the part of the digital image data corresponding to said desired area in place of the image based on the original digital image data, the image to be actually reproduced can be known immediately and in the event where the area of the image actually reproduced does not meet the request of the customer or the like, the area can be corrected.

In the image reproduction system and the second image confirmation system of the present invention, by making alarm when the number of the picture elements contained in the part of the digital image data corresponding to the desired area is smaller than a predetermined value, the operator can be informed of that there is a large possibility that the quality of the reproduced image is significantly deteriorated, which allows the operator to correct the area.

Further in the image reproduction system and the second image confirmation system of the present invention, by setting, when the number of the picture elements contained in the part of the digital image data corresponding to the desired area is smaller than a predetermined value, an alternative area where the number of the picture elements contained in the part of the digital image data corresponding to the area is not smaller than the predetermined value on the displayed image in place of the desired area, an acceptable quality of the reproduced image can be ensured even if the operator sets the desired area too small by error. Further when alarm is made in response to setting an alternative area, the operator can correct the desired area.

BRIEF DESCRIPTION OF THE DRAWINGS

FIG. 8 is a view showing the arrangement of the image reproduction system of the second embodiment.

DESCRIPTION OF THE PREFERRED EMBODIMENTS

Figure 1:
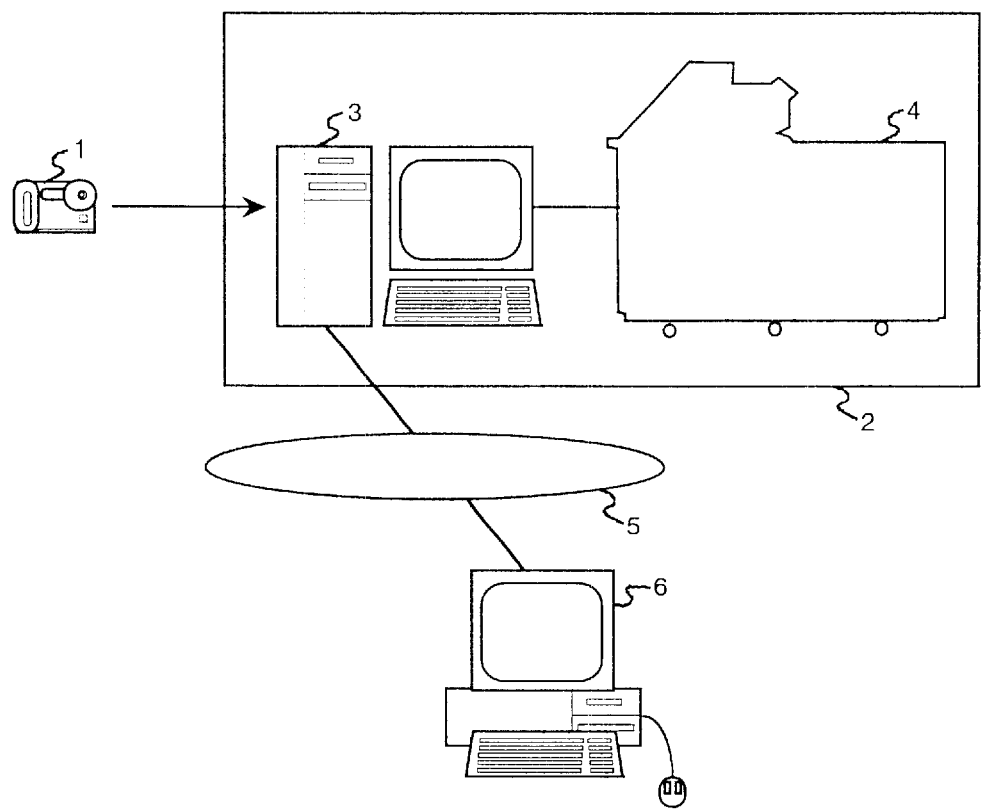
FIG. 1 is a schematic view showing an image reproduction system in accordance with a first embodiment of the present invention.

In FIG. 1, a photographic image taken by a digital camera 1 is taken in by an image handling apparatus 3 in a laboratory system 2 and is reproduced as a photographic print by a photographic printer 4. The digital image data representing the photographic image is stored in a large capacity hard disc attached to the image handling apparatus 3. The digital image data stored in the hard disc can be reproduced on the monitor of the image handling apparatus 3 and can be reproduced on a customer's personal computer 6 connected to the image handling apparatus 3 through a network 5.

The digital camera 1 is provided with a liquid crystal monitor on which an image taken is displayed and keys and dials for inputting or setting various factors. In the digital camera 1 shown in FIG. 2, the liquid crystal monitor 11 displays not only images taken by the digital camera 1 but also various input frames. Switching of the image display frame and the input frames and input of the factors can be performed by operation of a shutter release button 12 and setting keys 13a and 13b.

Figure 2:
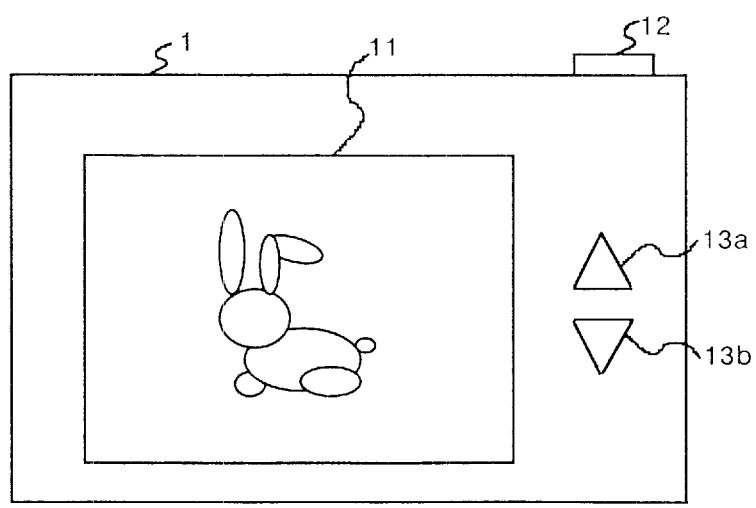
FIG. 2 is a rear view of a digital camera employed in the first embodiment.
Figure 3:
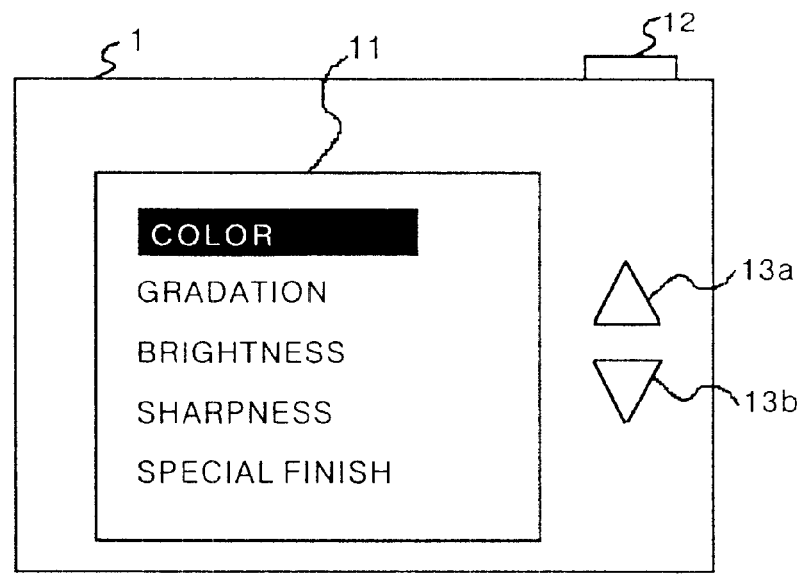
FIG. 3 is a view showing an example of a finish input frame.

When the setting keys 13a and 13b are pushed together, the display on the monitor 11 is switched from the image display frame shown in FIG. 2 to an input frame shown in FIG. 3. In the input frame shown in FIG. 3, one of the items "color", "gradation", "brightness", "sharpness" and "special finish" displayed as a menu can be selected by use of the setting keys 13a and 13b. The selected item is reversed. When the setting key 13a is pushed with one item selected, the item just above the item comes to be selected and when the setting key 13b is pushed with one item selected, the item just below the item comes to be selected. When the shutter release button 12 is pushed, the selected item is fixed.

Figure 4:
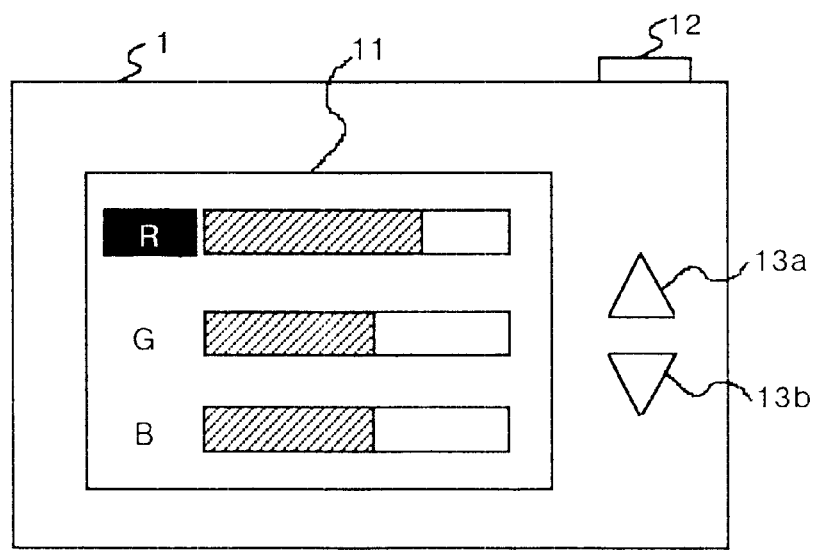
FIG. 4 is a view showing an example of a color balance input frame.

For example when the "color" is selected as shown in FIG. 3 and fixed by pushing the shutter release button 12, an input frame shown in FIG. 4 appears on the monitor 11. The input frame shown in FIG. 4 is for inputting a desired color balance by setting the values of R, G and B. By use of the setting keys 13a and 13b, one of R, G and B is selected and the selected item is fixed by pushing the shutter release button 12 as in the frame shown in FIG. 3. For example, in a state where the selected item is fixed to R, pushing the setting key 13a results in increase in the value of R and pushing the setting key 13b results in reduction in the value of R. For example, when roses are photographed as shown in FIG. 2 and red of the roses is to be emphasized, the value of R is increased as shown in FIG. 4. The values of R, G and B thus set are fixed by pushing the shutter release button 12.

After thus inputting a desired finish, image processing condition is determined according to the desired finish and the digital image data is processed according to the image processing condition determined. However since the number of picture elements of the image displayed on the monitor 11 is smaller as compared with that of the picture elements for producing a photographic print or that of an image displayed on a monitor of a personal computer, the image processing performed in the digital camera 1 need not be equivalent to that required when the digital image data is reproduced, for instance, as a photographic print. In the case of the example above, it is sufficient when that red of the roses is emphasized. However, when the monitor 11 has a certain resolution, it is of course preferred that the image processing performed in the digital camera 1 be as close to that required when the digital image data is reproduced as possible.

Though setting of color balance has been described above, the other items such as gradation, brightness and sharpness may be set in the similar manner by use of frames similar to that shown in FIG. 4 and the result of setting can be confirmed on the liquid crystal monitor 11.

Figure 5:
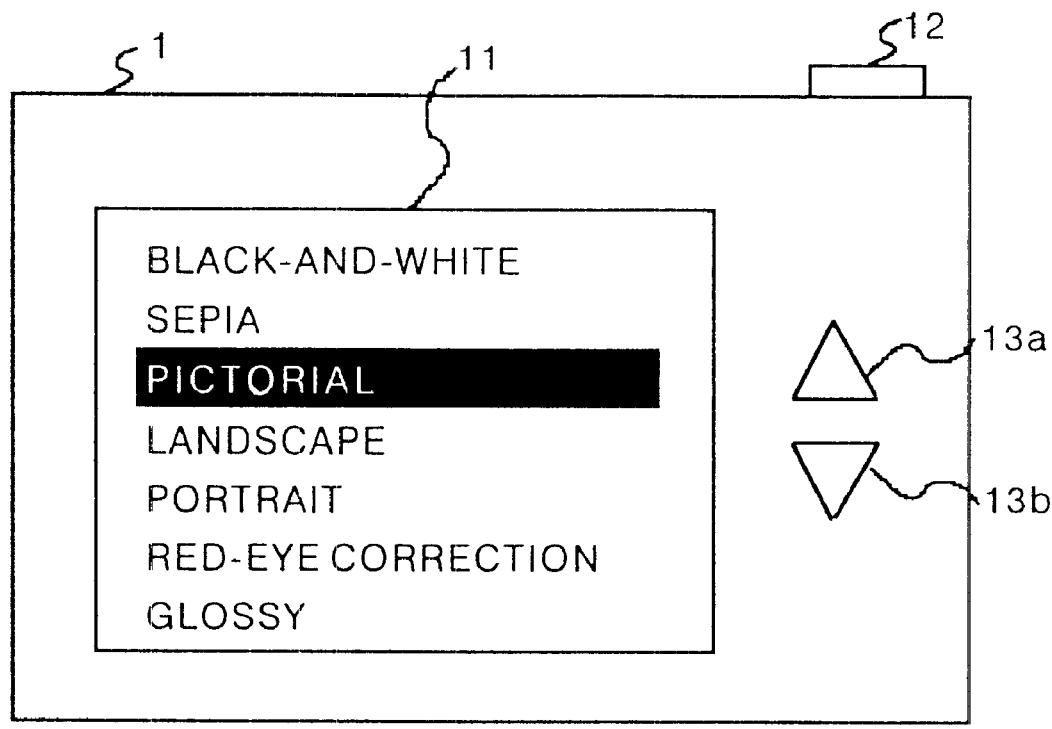
FIG. 5 is a view showing an example of a special finish input frame.

Though in the setting items above, color and brightness are numerically set, numerical set is not easy for photographers. Accordingly, in this particular embodiment, when the special finish in FIG. 3 is selected, a menu frame shown in FIG. 5 appears. That is, by selecting one of the items, "black-and-white", "sepia-tinged", "pictorial", "landscape", "portrait", "red-eye correction" and "glossy finish", the selected item is transferred to the laboratory as finish information and RGB and brightness are set in the laboratory according to the selected item. The items in the menu may include "setting sun finish", "snow finish", "depth", "soft finish", "high-key finish", "low-key finish", "reversal finish" and the like.

Figure 6:
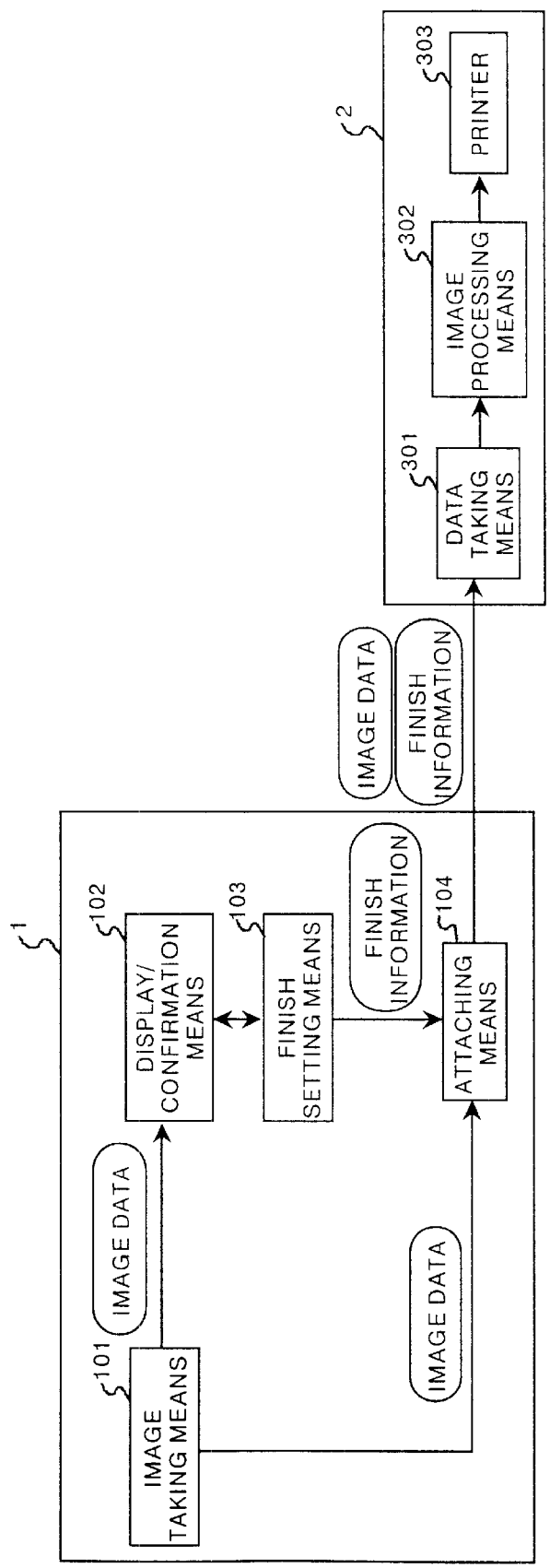
FIG. 6 is a view showing an internal arrangement of the image reproduction system.

FIG. 6 shows the internal structure of the system shown in FIG. 1 and the flow of data taken by photographing up to printing. The digital camera 1 is provided with an image taking means such as a CCD, a lens and the like, a display/confirmation means 102 such as the liquid crystal monitor 11, a finish setting means 103 such as the setting key 13 and a finish information attaching means 104.

An image data obtained by the image taking means 101 is displayed as a visible image on the monitor 11 by the display/confirmation means 102. Various setting values input by the photographer are input into the display/confirmation means 102 through the finish setting means 103. The image data is processed according to the setting values and an image is reproduced on the monitor 11 on the basis of the processed image data. When the image reproduced on the monitor 11 on the basis of the processed image data is acceptable and the photographer carries out an operation which instructs end of setting, the finish setting means 103 inputs information representing the finally set finish into the finish information attaching means 104. The final finish information is attached to the original image data by the finish information attaching means 104 and is stored in a built-in memory in the digital camera 1 or a memory card.

For example, the finish information may be attached to the image data by defining a file format including both the image data and the finish information and forming data according to the format. Otherwise the finish information may be stored as a file separately from the image data and the file for the finish information and the file for the image data may be associated with each other by use of file names or IDs defined separately. In this case, the file for the finish information and the file for the image data may be stored different media.

The image data and the finish information attached to the image data stored in the memory of the digital camera 1 are taken in by the laboratory system 2 through a data taking means 301 which may comprise a cable interface, a card reader or the like. Otherwise a customer transfers the data from the digital camera 1 to a personal computer and stores the data in a FD or the like, and then delivers the FD or the like to the laboratory. In the case where the file for the finish information and the file for the image data are stored different media, these files are separately taken in by the laboratory system 2.

The data taking means 301 takes in the image data and the finish information and an image processing means 302 processes the image data according to the finish information. The example shown in FIG. 6 is for reproducing the image data as a photographic print, and accordingly, the image processing means 302 enlarges the image data by interpolation so that the number of picture elements in the image data becomes suitable for printing and then carries out image processing on the enlarged image data according to the finish information. The processed image data is transferred to the printer 4 and the printer 4 outputs a print on which the request of the photographer is reflected.

Though description has been made on a case where the image data is reproduced as a photographic print, the similar processing may be employed when the image data is to be reproduced on a CRT of the laboratory system 2. Reproduction on a monitor may be realized on a customer's personal computer without through the laboratory, for instance, by incorporating a software, which can carry out image processing equivalent to that carried out by the image processing means 302, into the personal computer.

The image reproduction method and system and image confirmation system of the present invention will be described with reference to a second embodiment shown in FIG. 8, hereinbelow.

Figure 7:
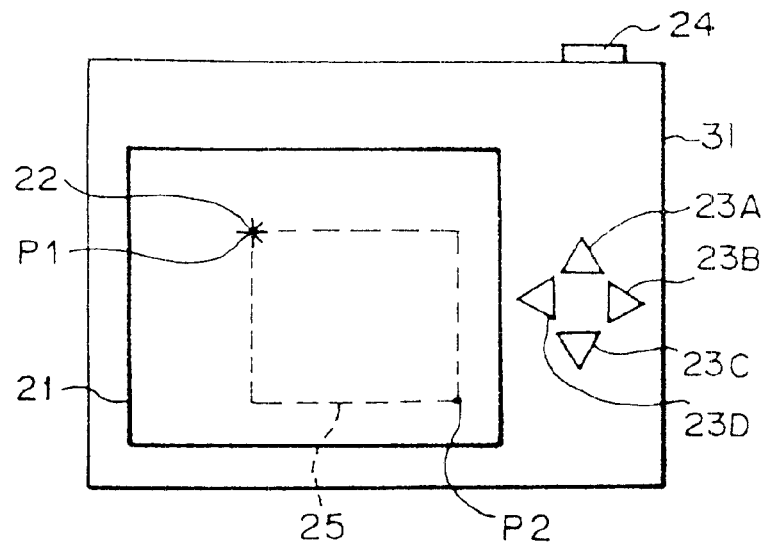
FIG. 7 is a rear view of a digital camera employed in a second embodiment of the present invention.

FIG. 7 shows a digital camera employed in the second embodiment. FIG. 8 shows a laboratory system of the second embodiment which reproduces an image data obtained by the digital camera as a photographic print or the like.

As shown in FIG. 7, the digital camera 31 which is employed in the second embodiment is provided with a liquid crystal monitor 21 for displaying a photographed image, four keys 23A, 23B, 23C and 23D for moving a cursor 22, which appears on the monitor 21, up and down and left and right, and a shutter release button 24.

With the photographed image displayed on the monitor 21, the cursor 22 is moved by operation of the keys 23A to 23D. When the shutter release button 24 is pushed with the cursor 22 positioned in a first desired position P1, the cursor 22 is fixed in the first desired position P1. Then when the cursor 22 is moved to a second desired position P2 and the shutter release button 24 is pushed, the cursor 22 is fixed in the second desired position P2 and at the same time, an area 25 having the segment P1P2 between the points P1 and P2 as a diagonal line is set on the monitor 21 as an area to be reproduced as a result of trimming. In the case where the aspect ratio of the printed image is determined in advance (generally 3:4), the area 25 is set after the position of the point P1 and/or P2 to conform to the preset aspect ratio. The area can be reset by moving the cursor 22 by pushing one of the keys 23A to 23D. The area 25 can be fixed by pushing the shutter release button 24 again.

As shown in FIG. 8, the digital camera 31 has an image taking section 34 including an optical system and the like and an AE processing section 34 for automatic exposure control. Though, in this particular example, the image taking section 34 also has a function of automatic focusing, whether such a function is provided and/or the level of the function differ by the type of the digital camera.

The digital camera 31 in the second embodiment is characterized by having a position information attaching section 36. The position information attaching section 36 is for attaching information 39 on the position of the area 25 set on the monitor 21 to the digital image data 38 obtained by the digital camera 31. Specifically the position information attaching section 36 attaches information on the positions of the picture elements at the upper left corner and the lower right corner of the area 25. That is, the image data 38 representing the image displayed on the monitor 21 is digital image data and the position of each picture element is represented by coordinates. The position information attaching means 36 configures the values (e.g., (x1, y1), (x2, y2)) of the coordinates of the picture elements at the upper left corner and the lower right corner of the area 25 into a predetermined data format and then attaches them to the image data 38. For example, the image data 38 and the position information 39 are combined into a set of image file 37 and the image file 37 is stored in the built-in memory or a card memory.

The image file 37 stored in the memory in the digital camera 31 is transferred to an image server 32 through a card reader, a cable or the like. The transfer of the data to the image server 32 may be performed in any known manner including use of a network.

The image reproduction system 33 of the second embodiment is for reproducing in sequence a plurality of image files 37 accumulated in the image server 32. The image reproduction system 33 comprises an extraction/processing section 40 which extracts the part of the image data 38 corresponding to the area 25 on the basis of the position information 39 for each image file 37 and carries out enlargement processing on the extracted part of the image data so that the extracted part of the image data conforms to the size of the image to be reproduced as described later, a setup section 41 which carries out an image processing for improving the quality of the reproduced image on the extracted and enlarged image data, and a printer 42 for outputting the setup image data as a print 44 or a display interface 43 for reproducing the image data as a visible image on a monitor 45.

Specifically the extraction/processing section 40 extracts from the original image data the part corresponding to the area 25 having the segment between the points (x1, y1) and (x2, y2) as a diagonal line on the basis of the values of (x1, y1) and (x2, y2) included in the position information 39 and carries out the enlargement processing on the extracted part of the image data 38.

The setup section 41 carries out an operation according a predetermined algorithm to obtain an optimal image processing condition and carries out an image processing according to the optimal image processing condition on the extracted and enlarged image data.

The operation of the second embodiment will be described hereinbelow. Photographing is carried out by use of the digital camera 31 and the photographed image is displayed on the monitor 21. The photographer moves the cursor 22 on the image by use of the keys 23A to 23D to set the area 25 which is to be reproduced after trimming. Then the area 25 is fixed by pushing the shutter release button 24. Thus the position information 39 on the area 25 is attached to the original image data 38 and the original image data 38 and the position information 39 are stored in the built-in memory or the card memory of the digital camera 31 as a set of image file 37. The image file 37 is copied to the image server 32 through a card reader or a cable. The image data 38 and the position information 39 may be stored as different files and may be stored in different media.

Then in the image reproduction system 33, the image server 32 reads out the image file 37. The extraction/processing section 40 extracts the part of the image data 38 corresponding to the area 25 on the basis of the position information 39 for the image file 37 and carries out enlargement processing on the extracted part of the image data so that the extracted part of the image data conforms to the size of a print 44 or the size of display on the monitor 45. The setup section 41 carries out an image processing for improving the quality of the reproduced image on the extracted and enlarged image data. The image data processed in the setup section 41 is reproduced as a print 44 by the printer 42 or as a visible image on the monitor 45 through the display interface 43.

Thus in the second embodiment, the area 25 to be reproduced after trimming is set on the photographed image on the liquid crystal monitor 21 and the position information 39 on the area 25 is stored together with the original image date 38 representing the photographed image. When a trimmed image is to be reproduced as a print 44 or as a visible image on the monitor 45, the trimmed image is reproduced on the basis of the extracted part of the image data corresponding to the area 25. Accordingly, only the image in the area 25 can be quickly reproduced without once reproducing the overall photographed image.

In the digital camera 31, an image in the area 25 may be enlarged and displayed in place of the image based on the original digital image data. By this, the image to be actually reproduced can be known immediately and in the event where the area of the image actually reproduced does not meet the request of the customer or the like, the area 25 can be corrected.

In the digital camera 31, an alarm means which generates alarm when the number of the picture elements contained in the area 25 is smaller than the number of the picture elements in the overall image displayed on the monitor 21, i.e., when the former is smaller than a half of the latter, may be provided, which informs the operator of that there is a large possibility that the quality of the reproduced image is significantly deteriorated and allows the operator to correct the area 25.

In this case, the area 25 may be automatically enlarged so that the number of the picture elements contained in the area 25 becomes not smaller than the number of the picture elements in the overall image displayed on the monitor 21.

Though, in the second embodiment described above, the shutter release button 24 is used for fixing the area 25, a separate setting button (not shown) may be provided to fix the area or the position information.

Figure 9:
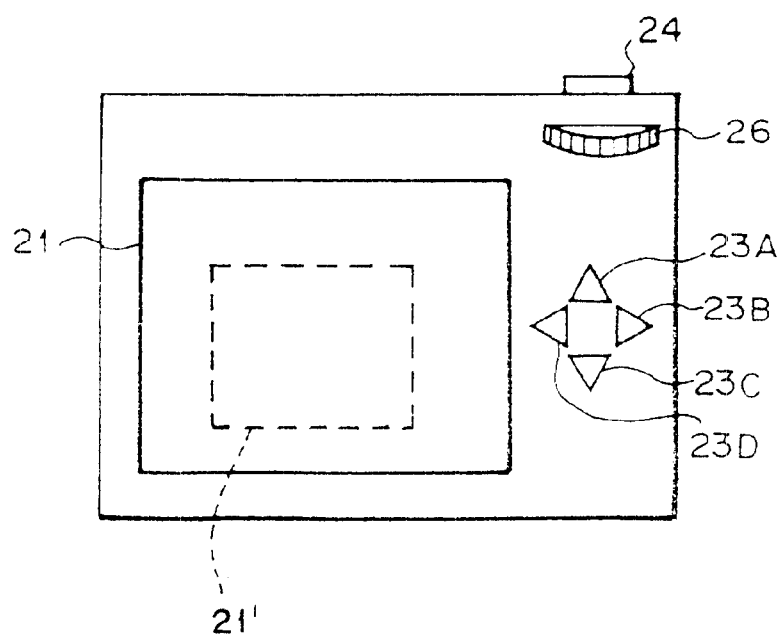
FIG. 9 is a rear view of another digital camera employed in the second embodiment.

In the digital camera 31, as shown in FIG. 9, a dial 26 for setting the size (corresponding to the zoom ratio) of the area 21' to be reproduced as a print 44 or a visible image on the monitor 45 may be provided together with keys 23A to 23D for moving the center of the area 21' up and down and left and right. In this case, the size and position of the area 21' may be set in response to photographing and information of the size and position of the area 21' may be filed as the image file 37 together with the image data 38 and the position data 39. The area 21' whose size and position are thus set is fixed by pushing the shutter release button 24 or a setting button (not shown) separately provided.

Though in the second embodiment, the area 25 is defined by setting the upper left corner and the lower right corner of the area 25 by the cursor 22, it may be defined by setting the upper right corner and the lower left corner of the area 25 or by setting all the four corners of the area 25. Further it is possible to set only the upper left corner of the area 25 and to define the area 25 as having a preset aspect ratio and a preset size.

Further in the second embodiment, the first position P1 and/or the second position P2 is corrected so that the area 25 has a preset aspect ratio. However it is possible to set the area 25 on the basis of the first and second positions P1 and P2 as set by the photographer.

Further when the photographed image may be reproduced as it is, position information 39 representing the entire image displayed on the monitor 21 is attached to the image data 38 by pushing a cancel button (not shown).

Though in the first and second embodiment, setting of the finish information or position information and confirmation of the image are performed by use of a digital camera with a liquid crystal monitor, a digital camera without monitor may be used. In this case, the digital camera is connected to a separate monitor, and setting of the finish information or position information and confirmation of the image are performed by displaying the similar setting frames and the image for confirmation on the monitor. Further the digital camera may be a mobile digital information terminal provided with the function of camera.

Further in the first embodiment, the finish information may include the position information similar to that in the second embodiment. In this case, a setting item "trimming" is added to the setting frame shown in FIG. 3, and when the "trimming" is selected, the frame shown in FIG. 7 for setting the area 25 is displayed. In this case, the cursor 22 is moved up and down when the setting key 13a is pushed and left and right when the setting key 13b is pushed. When the shutter release button 24 is pushed with the cursor 22 positioned in a first desired position P1, the cursor 22 is fixed in the first desired position P1. Then when the cursor 22 is moved to a second desired position P2 and the shutter release button 24 is pushed, the cursor 22 is fixed in the second desired position P2 and at the same time, an area 25 having the segment P1P2 between the points P1 and P2 as a diagonal line is set on the monitor 21 as an area to be reproduced as a result of trimming.

Further though in the first and second embodiment, the finish information or the position information is set on a digital camera, it is possible to set the finish information or the position information in other instruments such as an image scanner which can obtain digital image data.

What is claimed is:

1. An image processing method utilizing an image confirmation device comprising:
    setting a desired finish for digital image data;
    confirming a finish of an image on which processing has been administered to be of said desired finish by displaying said image;
    attaching finish data that represents said set finish to said digital image data after said confirmation is completed wherein the finish data and the digital image data are recorded in a same computer readable medium where the finish data and the digital image data are related to each other; and
    administering image processing on said digital image data so that a finish according to said finish data is obtained.

2. An image processing method as defined in claim 1, wherein digital image data on which said image processing has been administered is reproduced as a visible image.

3. An image processing apparatus comprising:
    an image confirmation device having:
        a finish setting function for setting a desired finish for digital image data;
        a finish confirmation function for confirming a finish of an image on which processing has been administered to be of said desired finish by displaying said image; and a finish data attachment function for attaching finish data that represents said set finish to said digital image data after said confirmation is completed wherein the finish data and the digital image data are recorded in a same computer readable medium where the finish data and the digital image data are related to each other;

a data input means for inputting said finish data and said digital image data from said image confirmation device; and an image processing means for administering image processing on said digital image data so that a finish according to said finish data is obtained.

4. An image processing apparatus as defined in claim 3, further comprising an image reproducing means for reproducing digital image data, on which said image processing has been administered, as a visible image.

5. A printer provided with an image processing apparatus as defined in claim 3.

6. An image confirmation device comprising:

a finish setting means for setting a desired finish for digital image data;

a display confirmation means for enabling confirmation of a finish of an image on which processing has been administered to be of said desired finish by displaying said image; and a finish data attachment means for attaching said set finish data to said digital image data after said confirmation is completed wherein the finish data and the digital image data are recorded in a same computer readable medium where the finish data and the digital image data are related to each other.

7. An image confirmation device as defined in claim 6, wherein said finish setting means sets a color and/or a gradation balance of an image to be reproduced.

8. An image confirmation device as defined in claim 6, wherein said finish setting means sets a brightness level of an image to be reproduced.

9. An image confirmation device as defined in claim 6, wherein said finish setting means sets a reproduction region of an image to be reproduced.

10. An image confirmation device as defined in claim 6, wherein said finish is set by selecting a desired finish from among a plurality of predefined finishing processes.

11. A digital camera provided with an image confirmation device as claim 6.

12. A printer provided with an image confirmation device as defined in claim 6.

13. An image reproducing method for displaying digital image data as an image utilizing an image confirmation device having a positional data obtainment function for obtaining positional data related to a set desired region and a positional data attachment function for attaching said positional data to said digital image, the image reproducing method comprising the steps of:

inputting positional data and digital image data;

selecting, based on said positional data, digital image data corresponding to said desired region wherein the positional data and the digital image data are stored on a same computer readable medium where the positional data and the digital image data are related to each other; and reproducing said selected digital image data.

14. An image reproducing method as defined in claim 13, wherein said image confirmation device displays an image of said desired region, based on said positional data, instead of the original image.

15. An image reproducing method as defined in claim 13, wherein an alarm is issued in the case that the number of pixels in the digital image data corresponding to said desired region is less than a predetermined value.

16. An image reproducing method as defined in claim 13, wherein a region having a number of pixels at least equal to a predetermined value is set as said image instead of said desired region in the case that the number of pixels in the digital image data corresponding to said desired region is less than said predetermined value.

17. An image reproducing apparatus comprising:

an image confirmation device for displaying digital image data as an image, while having a function for obtaining positional data related to a set desired region of said image and a positional data attachment function for attaching said positional data to said digital image data;

a data input means for inputting said positional data and said digital image data;

a data selecting means for selecting, based on said positional data, digital image data corresponding to said desired region from the original digital image data wherein the positional data and the digital image data are stored on a same computer readable medium where the positional data and the digital image data are related to each other; and a reproducing means for reproducing the digital image data selected by said data selecting means.

18. A digital camera provided with an image reproducing apparatus as defined claim 17.

19. A printer provided with an image reproducing apparatus as defined in claim 17.

20. An image confirmation device comprising:

a display means for displaying digital image data as an image;

a region setting means for setting a desired region within said image displayed by said display means; and a positional data attachment means for attaching positional data related to a region set by said region setting means to said digital image data wherein the positional data and the digital image data are stored on a same computer readable medium where the positional data and the digital image data are related to each other.

21. An image confirmation device as defined in claim 20, further comprising a desired region display means for displaying, based on said positional data, an image of said desired region instead of the original image.

22. An image confirmation device as defined in claim 20, further comprising a warning means for issuing an alarm in the case that the number of pixels in the digital image data corresponding to said desired region is less than a predetermined value.

23. An image confirmation device as defined in claim 20, further comprising a region resetting means for setting a region having a number of pixels at least equal to a predetermined value as said image instead of said desired region in the case that the number of pixels in the digital image data corresponding to said desired region is less than said predetermined value.

24. A printer provided with an image confirmation device as defined in claim 20.

25. An image processing method comprising:

inputting digital image data in a first apparatus;

setting finish data based on the digital image data in the first apparatus;

confirming the finish of an image on which processing has been administered by displaying the image;

attaching the digital image data and the finish data wherein the digital image data and the finish data are stored on the same computer readable medium and where the finish data and the digital image data are related to each other;

transmitting the attached digital image data and finish data to a second apparatus; and processing the transmitted attached digital image data and finish data wherein a finish is obtained based upon the transmitted finish data.

26. An image processing system comprising:

an input device for inputting digital image data in a first apparatus;

a finish setting module for setting finish data based on the digital image data in the first apparatus;

a confirmation module for confirming the finish of an image on which processing has been administered by displaying the image;

an attachment module for attaching the digital image data and the finish data wherein the digital image data and the finish data are stored on the same computer readable medium and where the finish data and the digital image data are related to each other;

a transmitter for transmitting the attached digital image data and finish data to a second apparatus; and a processor for processing, at the second apparatus, the transmitted attached digital image data and finish data wherein a finish is obtained based upon the transmitted finish data.

* * * * *